(12) United States Patent
Wirth

(10) Patent No.: US 9,145,820 B2
(45) Date of Patent: Sep. 29, 2015

(54) EXHAUST SYSTEM COMPONENT

(75) Inventor: Georg Wirth, Kircheim/Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 756 days.

(21) Appl. No.: 13/451,848

(22) Filed: Apr. 20, 2012

(65) Prior Publication Data
US 2012/0266999 A1    Oct. 25, 2012

(30) Foreign Application Priority Data
Apr. 21, 2011    (DE) .................. 10 2011 007 854

(51) Int. Cl.
| | |
|---|---|
| F16L 9/14 | (2006.01) |
| F01N 13/16 | (2010.01) |
| F01N 3/04 | (2006.01) |
| F01N 3/05 | (2006.01) |
| F01N 13/14 | (2010.01) |

(52) U.S. Cl.
CPC ............... *F01N 13/16* (2013.01); *F01N 3/043* (2013.01); *F01N 3/046* (2013.01); *F01N 3/055* (2013.01); *F01N 13/141* (2013.01); *F01N 13/143* (2013.01); *F01N 13/146* (2013.01); *F01N 2260/024* (2013.01); *Y02T 10/20* (2013.01)

(58) Field of Classification Search
CPC ....... F16L 59/024; F16L 59/16; F01N 13/102
USPC .................................. 138/148, 149
See application file for complete search history.

(56) References Cited

U.S. PATENT DOCUMENTS

| | | | | |
|---|---|---|---|---|
| 3,058,860 | A | * | 10/1962 | Rutter ........................ 138/147 |
| 3,628,572 | A | * | 12/1971 | Shannon ..................... 138/161 |
| 3,891,009 | A | | 6/1975 | Noda et al. |
| 4,182,122 | A | * | 1/1980 | Stratton et al. ................ 60/322 |
| 4,298,554 | A | * | 11/1981 | Vogel et al. .................. 264/432 |
| 4,304,267 | A | * | 12/1981 | Campbell, Jr. .............. 138/149 |
| 4,581,804 | A | * | 4/1986 | McLaughlin .................. 29/451 |
| 5,556,689 | A | * | 9/1996 | Kratel et al. ................ 428/137 |
| 7,757,722 | B1 | * | 7/2010 | Lesch et al. ................ 138/149 |
| 8,539,986 | B2 | * | 9/2013 | Kroll et al. ................ 138/149 |
| 2003/0182937 | A1 | | 10/2003 | Fukumoto et al. |
| 2004/0146678 | A1 | * | 7/2004 | Kroon ....................... 428/36.91 |
| 2009/0038302 | A1 | | 2/2009 | Yamada et al. |

FOREIGN PATENT DOCUMENTS

| | | |
|---|---|---|
| JP | 11 218 021 A | 8/1999 |
| WO | 2007/105 815 A1 | 9/2007 |

* cited by examiner

*Primary Examiner* — Patrick F Brinson
(74) *Attorney, Agent, or Firm* — McGlew and Tuttle, P.C.

(57) ABSTRACT

An exhaust system component (5) is provided for an exhaust system (1) of an internal combustion engine, especially of a motor vehicle, with an inner shell (6), which defines an exhaust-gas-guiding inner area (7), with an outer shell (8), which is arranged on an outer side of the inner shell (6) turned away from the inner area (7), with a cavity formed between inner shell (6) and outer shell (8), and with heat insulation (10) arranged in the cavity (9). The heat insulation of the component (5) includes insulation (10) having at least one microporous molding (molded body) (11).

20 Claims, 3 Drawing Sheets

EXHAUST SYSTEM COMPONENT

CROSS REFERENCE TO RELATED APPLICATIONS

This application claims the benefit of priority under 35 U.S.C. §119 of German Patent Application DE 10 2011 007 854.1 filed Apr. 21, 2011, the entire contents of which are incorporated herein by reference.

FIELD OF THE INVENTION

The present invention pertains to an exhaust system component for an exhaust system of an internal combustion engine, especially of a motor vehicle. The present invention also pertains to an exhaust system equipped with at least one such component.

BACKGROUND OF THE INVENTION

Such components of exhaust systems are, for example, exhaust gas treatment means, for example, catalytic converters, particle filters and mufflers, inlet elbows, tail pipes as well as tube sections for connecting exhaust gas treatment means, elbows and tail pipes. For reducing obnoxious emissions of an internal combustion engine, it is important for the exhaust gas purifying means of the exhaust system to reach its operating temperature as fast as possible in case of a cold start of the internal combustion engine. This can especially be supported in that the exhaust system or its components are heat insulated towards the outside to thus reduce the radiation of heat into the environment. At the same time, in vehicle applications, vehicle components that are arranged adjacent to the exhaust system are protected against overheating.

SUMMARY OF THE INVENTION

The object of the present invention is to provide an improved embodiment for an exhaust system component or for an exhaust system that is especially characterized by an improved heat insulation.

According to the invention, an exhaust system component is provided for an exhaust system of an internal combustion engine. The exhaust system component comprises an inner shell which defines an exhaust-gas-guiding inner area an outer shell arranged on an outer side of said inner shell turned away from said inner area and heat insulation. The inner shell and the outer shell cooperate to form a cavity between the inner shell and the outer shell. The insulation comprises a porous dimensionally stable molding.

The present invention is based on the general idea of using at least one dimensionally stable molding (molded body) for heat insulation, which has a porous design or consists of a porous insulation material. The molding is arranged between an inner shell, which defines an exhaust-gas-guiding inner area, and an outer shell arranged outside on the inner shell. Compared to conventional mat-like, fiber-containing insulation materials, such a porous molding is characterized by a markedly lower heat conduction coefficient. In this respect, an especially effective heat insulation of the respective exhaust system component can be achieved by means of such a porous molding. Furthermore, the molding has its own load-bearing capacity or dimensional stability, as a result of which a certain stiffening of the respective exhaust system component can also be achieved via the molding. The molding can then support the inner shell against the outer shell.

Corresponding to an advantageous embodiment, the respective molding may have a flexurally rigid design, which supports the support function of the molding. In addition or as an alternative, the molding may be adapted to the shape of the cavity formed between the inner shell and outer shell. Consequently, the respective molding is essentially self-supporting, which simplifies its handling. Especially advantageous is an embodiment, in which the molding is microporous or consists of a microporous insulation material. Suitable microporous materials for manufacturing such moldings are, for example, foams made of pyrogenic silicic acid or of aerogel. The microporous insulation material may preferably have a pore size of approximately 10 nm to 50 nm, and preferably of approx. 20 nm. The average free path for gas molecules can especially be reduced thereby so far that a heat transfer by means of convection can be significantly reduced within the microporous structure of the molding. In addition or as an alternative, material particles of the insulation material, of which the porous molding is made, may have a spherical shape, as a result of which material particles adjacent to one another touch only in very small contact points, which very strongly reduces a heat transfer due to heat conduction within the porous structure of the molding. In addition or as an alternative, materials or substances, which have an absorbing action in the infrared range of light, may be added to the porous insulation material of the molding. Consequently, it is possible to reduce heat transfer due to heat radiation within the porous molding significantly.

According to an advantageous embodiment, the insulation may comprise a plurality of microporous moldings, whereby at least two moldings mesh with one another in a positive-locking manner. The moldings may consequently be positioned in relation to one another, without expensive fastening measures being required for this. For example, notches or groove and tongue contours may be formed for embodying the said positive lock on the moldings. Moreover, a segmenting of the molding is preferable especially if the inner wall is designed as a duct or tube and encloses the gas-guiding inner area. In this case, the outer shell preferably encloses the inner shell in a ring-shaped manner, as a result of which an annular cavity is formed, in which the insulation is accommodated. Segmented moldings can especially be used in this cavity in a simple manner.

Corresponding to an especially advantageous embodiment, the cavity may be designed as water-tight and gas-impermeable to the environment of the exhaust system body. Consequently, splash water from the environment is prevented from being able to reach the cavity. To make a pressure compensation possible at the same time, the outer shell may contain at least one opening, which is closed by means of a water-tight and gas-permeable membrane, e.g., in the form of a microporous metal foil. In addition or as an alternative, a vent may be connected to the cavity, and preferably to the outer shell, by means of which a pressure compensation is possible. According to another embodiment, the cavity may be designed as water-tight and gas-impermeable to the environment of the exhaust system components. For example, the outer shell may contain at least one opening that is covered by means of a scoop, which, with the outer shell, forms an opening to the environment at a distance from the opening of the outer shell. Consequently, a pressure compensation is possible with sufficient protection against splash water.

According to another preferable embodiment, the inner shell and the outer shell may have a tubular design, while the cavity and insulation have an annular design. The respective molding is then also designed as annular or ring-segmentshaped to be able to be inserted simply into the respective cavity during the assembly of the exhaust system component.

Corresponding to a variant, a longitudinal section of the tubular inner shell can be formed by means of a bellows (corrugated tubular body). Consequently, it is possible to rigidly connect the inner shell to the outer shell at its longitudinal ends. Heat-induced expansion effects may be compensated here by the bellows. Such a bellows may have a single-layer or multilayer design. Especially preferable here is an embodiment, in which the bellows is covered with a guide tube on a side facing the inner area. Consequently, the flow resistance of the tubular inner shell, whose inner contour is disturbed by the bellows, can be reduced in the area of the bellows. The guide tube can especially cover the bellows almost flush with longitudinal sections adjacent thereto, so that the inner contour of the inner shell in the area of the bellows is not disturbed or only slightly. Preferably, the bellows extends only outwardly, i.e., into the cavity starting from the inner shell in the radial direction. Especially advantageous is an embodiment, in which the guide tube is fixed at a longitudinal end in relation to the inner shell or in relation to the bellows and is otherwise loose in relation to the inner shell and in relation to the bellows. Thus, heat-induced relative motions between the guide tube and bellows or between the guide tube and inner shell are possible.

According to another advantageous embodiment, a pressure setting means may be provided, by means of which the pressure prevailing in the cavity can be set depending on the parameters. The heat transfer between the inner shell and outer shell, especially due to convection, depends highly on the pressure in the cavity. Should, for example, the heat insulation be improved, the pressure in the cavity can be lowered under ambient pressure to achieve a more or less pronounced vacuum. This may be advantageous, for example, during the cold start operation. If, on the other hand, an especially high heat insulation is no longer necessary, the pressure in the cavity can be increased, for example, to ambient pressure or to a slight overpressure in order to thermally reduce the load on the component.

In addition or as an alternative, a filling and emptying means may be provided, by means of which the cavity can be filled with a heat-conducting fluid and emptied thereof depending on parameters. To be able to further lower the heat insulation, for example, to avoid an overheating of the exhaust system component, the cavity can be filled with a heat-conducting fluid by means of such a filling and emptying means, as a result of which the heat transfer between the inner shell and outer shell is increased significantly. The heat-insulating action of the respective molding can especially thereby be more or less avoided. To improve the heat insulation again, the cavity can then again be emptied of the heat-conducting fluid using the filling and emptying means. It is clear that a filling with heat-conducting fluid is only possible if the material used for making the molding has a corresponding resistance to the heat-conducting fluid used in each case. Suitable heat-conducting fluids are, for example, water, glycol and the like. A line for removing and supplying the heat-conducting fluid is preferably connected in the installed state at the bottom, especially at the lowest point, at the cavity to be able to achieve an extensive as possible emptying. An opening for aerating and venting the cavity may optionally be provided in the installed state at the top, especially at the highest point. In order to avoid the penetration of contaminants, and especially splash water, here as well, a suitable valve means may be provided. It is also conceivable to connect the aerating and vent opening via an aerating and venting line to a storage tank, into which the heat-conducting fluid is conveyed, when the cavity is emptied, and from which the heat-conducting fluid is obtained when the cavity is filled with the heat-conducting fluid. The fluid conveyed back and forth displaces, in the respective target space to be filled with fluid, exactly as much air or other gas as must be refilled to the respective starting space, from which the fluid is drawn. By means of the direct connection of the two spaces, the air or respective gas can thus be conveyed back and forth. Thus, it is also possible to convey the respective gas back and forth by means of a corresponding conveying means instead of the fluid; the fluid then follows automatically.

The above-mentioned pressure setting means and/or above-mentioned filling and emptying means may have a pump connected to the cavity and a control unit for actuating the pump depending on parameters. Suitable parameters for actuating the respective means are vehicle parameters or state parameters of the internal combustion engine, especially the temperature of the internal combustion engine or of the exhaust system and its components.

The respective molding preferably has an open-pore structure, especially if the cavity can be filled with a heat-conducting fluid and/or if the pressure in the cavity can be controlled.

According to another advantageous embodiment, the outer shell can be designed as a supporting structure, while the inner shell is preferably designed as a non-supporting structure. By means of this construction, the outer shell can especially be used in a simple manner for integrating the respective component into the exhaust system, while the inner shell is mainly used for guiding exhaust gas. In such a construction, the outer shell may have a thick wall compared to the inner shell, while the inner shell has a correspondingly thin wall compared to the outer shell. The outer shell may be made at a relatively low cost, for example, from a ferrite material, since it is exposed only to a highly reduced thermal load. In contrast to this, the inner shell is manufactured from a relatively expensive, corrosion-resistant material, for example, from a material made of austenite. However, since the inner shell can be made markedly thinner than the outer shell, a relatively low-cost structure can be produced in combination.

The exhaust system component formed by means of the inner shell, the at least one molding and the outer shell is especially a tube or a housing for an exhaust gas treatment means. This component may also be an inlet elbow or a tail pipe.

It is apparent that the above-mentioned features, which will also be explained below, can be used not only in the particular combination indicated, but in other combinations or alone as well without going beyond the scope of the present invention.

Preferred exemplary embodiments of the present invention are shown in the drawings and will be explained in more detail in the following description, where identical or similar or functionally identical components are designated by the same reference numbers. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
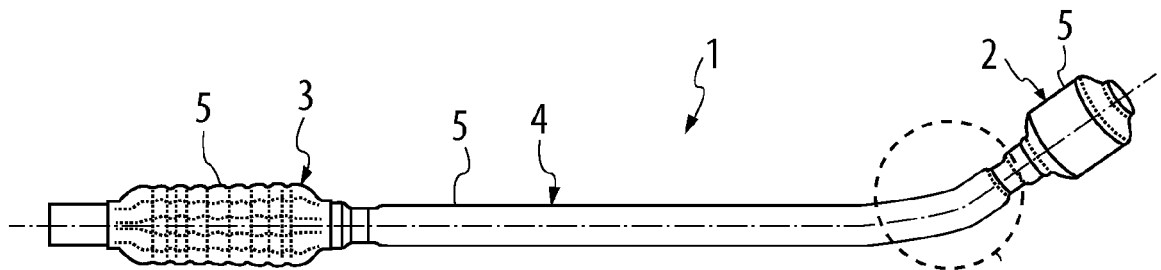
FIG. 1 is a simplified lateral view of a partial area of an exhaust system according to the invention.

Referring to the drawings in particular, corresponding to FIG. 1, an exhaust system 1, which is used for exhausting combustion exhaust gases from an internal combustion engine not shown here and can be arranged especially together with this internal combustion engine in a vehicle, comprises, for example, an oxidation catalyst 2, a muffler 3 as well as an exhaust gas pipe 4, which connects the oxidation catalyst 2 to the muffler 3. The oxidation catalyst 2, muffler 3 and exhaust gas pipe 4 each form examples of exhaust system component 5. Further exhaust system components 5 are, for example, an inlet elbow, a turbine of an exhaust gas turbocharger, a particle filter, an SCR catalyst, an NOX storage catalyst as well as a tail pipe.

The present invention is explained based on the exhaust gas pipe 4 as an exemplary exhaust system component 5. It is clear that the present invention can correspondingly be embodied with any other exhaust system component 5 as well.

According to FIGS. 3, 5, 7-11, the exhaust system component 5 has, in the example, i.e., exhaust gas pipe 4, an inner shell 6, which defines an inner area 7. In the operation of the exhaust system 1, this inner area 7 is used for guiding exhaust gas. In the tubular exhaust system component 5, the inner shell 6 also has a tubular design, so that it encloses the inner area 7. Further, the respective component 5 comprises an outer shell 8, which is arranged on an outer side of the inner shell 6 that is turned away from the inner area 7, in such a way that a cavity is formed between the inner shell 6 and outer shell 8. In a tubular component 5, the outer shell has a tubular design as well, so that it encloses the inner shell 6 coaxially. Heat insulation 10, which has at least one microporous molding (molded body) 11 according to the present invention, is arranged in the cavity 9. The respective molding 11 has a dimensionally stable and flexurally rigid design. Furthermore, the molding 11 which is designed as a molding is largely adapted to the shape of the cavity 9.

Figure 8:
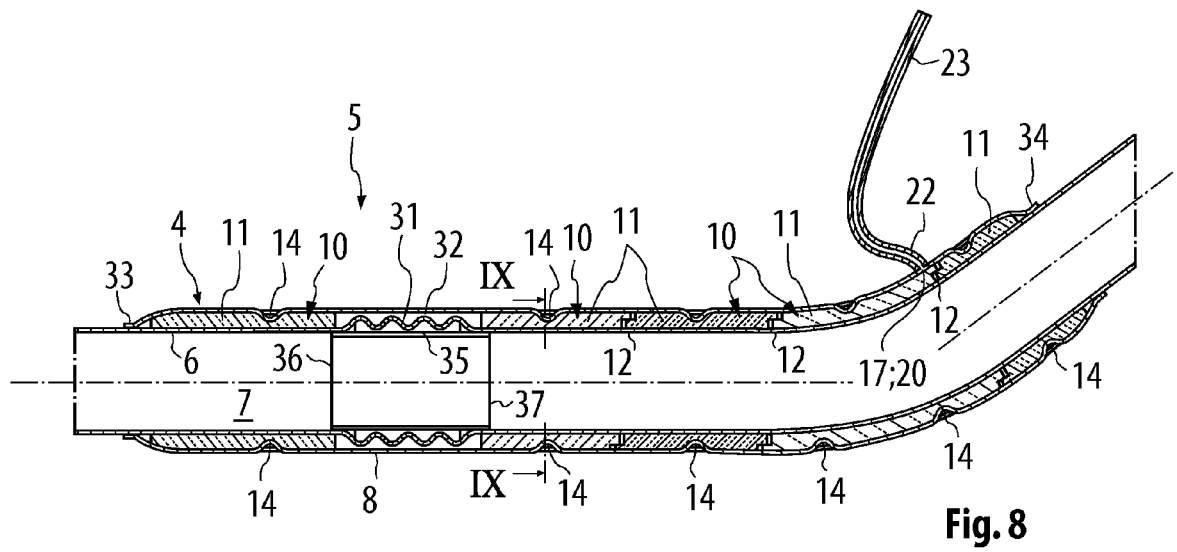
FIG. 8 is a longitudinal sectional view through an exhaust system component according to the invention.
Figure 9:
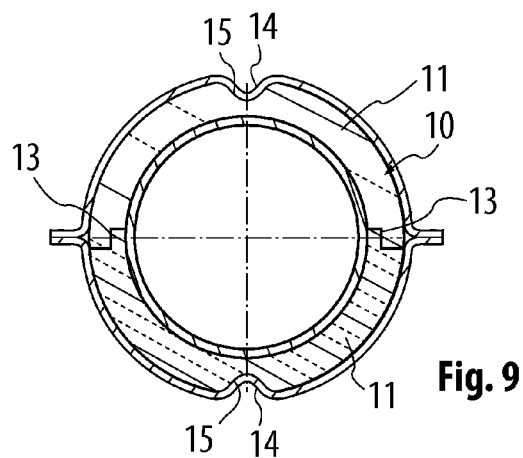
FIG. 9 is a cross sectional view taken along lines IX-IX in FIG. 8.
Figure 11:
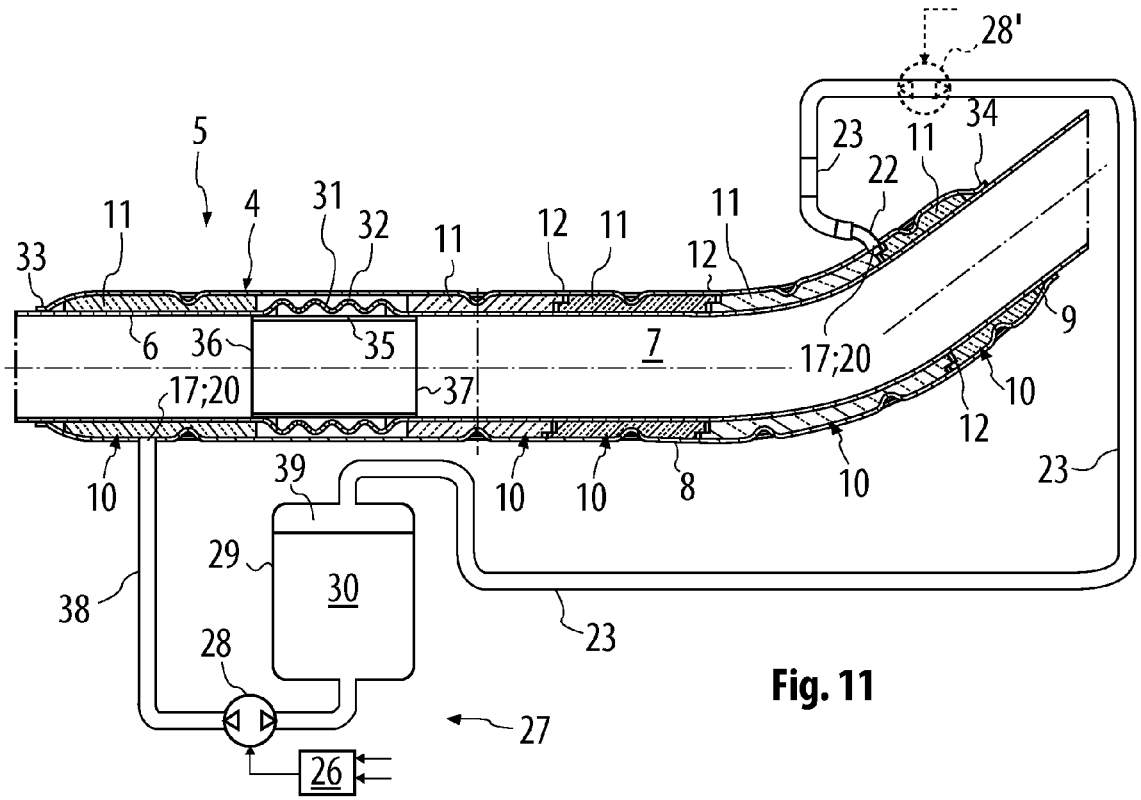
FIG. 11 is a sectional views as in FIG. 8, showing a different embodiment.

As can be derived, for example, from FIGS. 8, 9 and 11, the insulation preferably comprises a plurality of moldings 11. These may, e.g., be designed such that moldings 11 that are adjacent or lying next to one another mesh with one another in a positive-locking manner. Notch-like contours or tongue and groove contours 12, via which adjacent moldings 11 mesh with one another axially and overlap one another radially, are recognizable in the longitudinal sections of FIGS. 8 and 11. Likewise notch-like contours or tongue and groove contours 13, via which segment-like moldings 11 mesh with one another in the circumferential direction and thereby overlap one another radially, are recognizable in the cross section of FIG. 9. Moreover, the sectional plane in FIG. 9 is selected in the area of the elevations 14, which are formed in a punctiform manner on the outer shell 8 and project from the outer shell 8 inwardly in the direction of the inner shell 6, i.e., into the cavity 9. Complementary thereto, the respective moldings 11 are equipped with matching depressions 15, with which the projections 14 of the outer shell mesh radially in a positive-locking manner. As a result of this, an effective positioning of the moldings 11 in question can be carried out.

Figure 2:
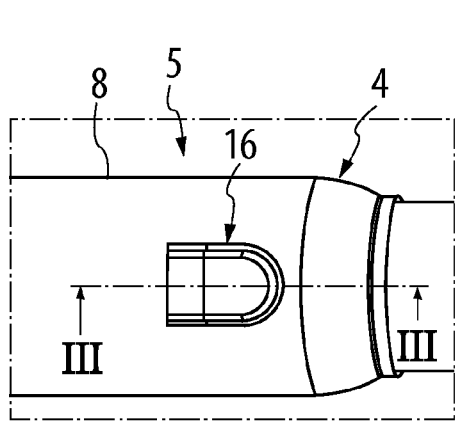
FIG. 2 is an enlarged view of a detail II from FIG. 1 in the area of an exhaust system component.
Figure 3:
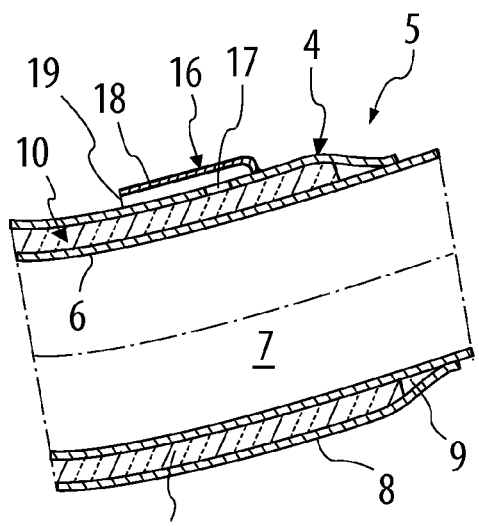
FIG. 3 is a sectional view taken along lines III-III in FIG. 2.

The embodiment shown in FIGS. 2 and 3 is equipped with a protection against splash water 16 for the cavity 9. The cavity 9 is protected against splash water towards the environment of the exhaust system 1 and has a gas-permeable design. The gas permeability is embodied by means of at least one opening 17, which is formed in the outer shell 8 for this purpose. This opening 17 is covered by means of a scoop 18. Together with the outer shell 8, this scoop 18 forms another opening 19 to the environment, which is at a distance from the above-mentioned opening 17 of the outer shell 8. As a result of this, the protection against splash water 16 is formed by means of the scoop 18. Apart from its opening 19, the scoop 18 is recognizable as being otherwise connected rigidly and tightly to the outer shell 18, wherein a U-shaped system contour is especially produced.

Figure 4:
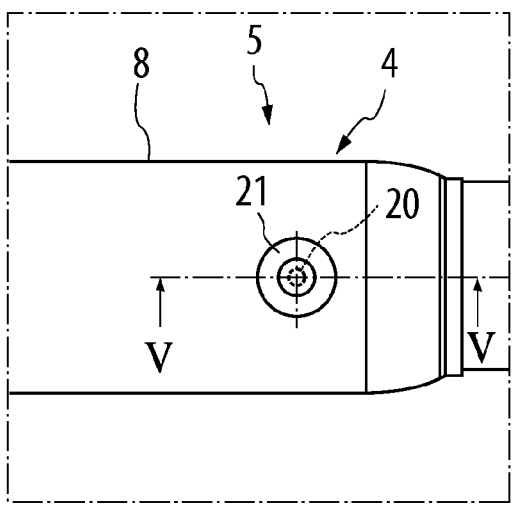
FIG. 4 is a detail view as in FIG. 2, but showing a different embodiment.
Figure 5:
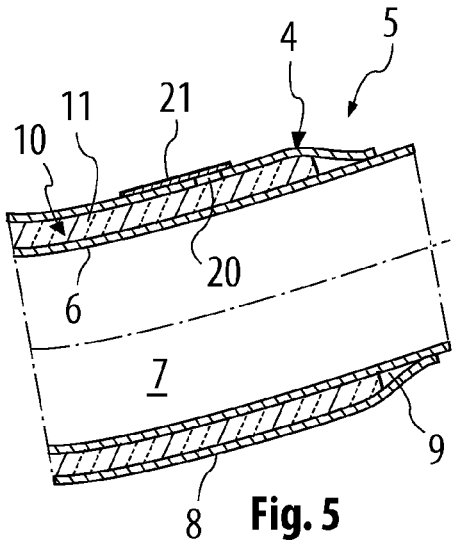
FIG. 5 is a sectional view taken along lines V-V in FIG. 4.

In contrast thereto, FIGS. 4 and 5 show an embodiment, in which the cavity 9 is designed as being water-tight and gas-permeable to the environment of the exhaust system component 5. This is, for example, achieved by the outer shell 8 containing at least one opening 20, which is closed by means of a membrane 21, wherein this membrane 21 is designed as being water-tight and gas-permeable.

Figure 6:
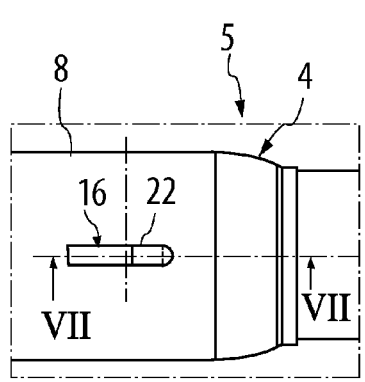
FIG. 6 is a detail view as in FIGS. 2 and 4, but showing a different embodiment.
Figure 7:
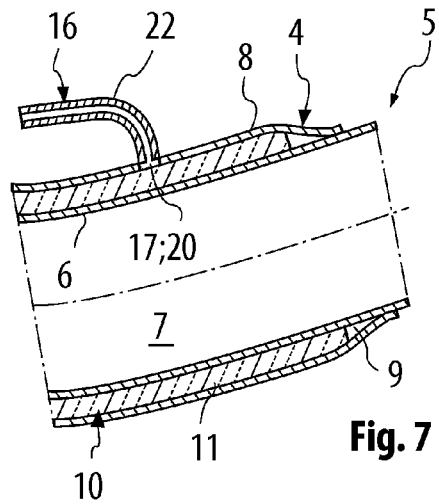
FIG. 7 is a sectional view taken along lines VII-VII in FIG. 6.

In the embodiment shown in FIGS. 6 and 7, the outer shell 8 is again equipped with an opening 17 or 20, wherein a piece of pipe 22 is connected to this opening 17, 20. This piece of pipe 22 may now be used as protection against splash water 16 or according to FIG. 8 be used for connecting a line 23. This line 23 can especially be used for embodying a venting of the cavity 9.

Figure 10:
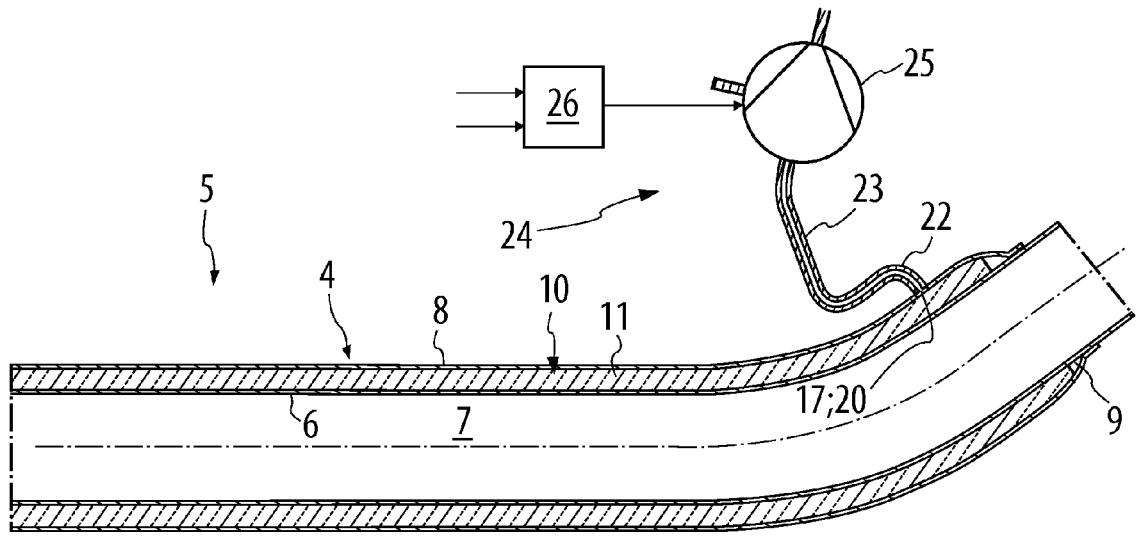
FIG. 10 is a sectional views as in FIG. 8, showing a different embodiment.

According to FIG. 10, a pressure setting means 24 can especially advantageously be connected via the line 23 to the cavity 9 by means of the line 23. By means of the pressure setting means 24, the pressure prevailing in the cavity 9 can be set depending on parameters. In the example, the pressure setting means 24 comprise an evacuating pump 25 fluidically connected to the cavity 9 on the suction side as well as a control unit 26 for actuating the pump 25 depending on parameters. Suitable parameters are especially vehicle parameters or state parameters of the internal combustion engine. For example, the cavity 9 shall be evacuated for a cold start operation in order to improve the heat insulation. As soon as the respective exhaust system component 5 or exhaust system 1 has reached its normal operating temperature, the vacuum can again be abolished, since a reduced heat insulation is then also sufficient.

As an alternative, according to FIG. 11, a filling and emptying means 27 can be connected to the cavity 9. Such a means 27 comprises, for example, a conveying means 28 with reversible direction of conveying as well as a tank 29 for storing a heat-conducting fluid 30, for example, water or glycol. The cavity 9 can be more or less filled with heat-conducting fluid 30 by means of the filling and emptying means 27 depending on the parameters. Likewise, the heat-conducting fluid 30 may again be removed from the cavity 9 by means of the means 27. The heat-insulating action of the respective molding 11 is correspondingly more or less reduced by the more or less intense filling of the cavity 9 with heat-conducting fluid 30. Thus, said means 27 can be used to set the heat insulation 10 depending on need. The use of such a means 27 requires that the respective porous material, from which the moldings 11 are made, have a sufficient resistance to the heat-conducting fluid 30 used. The filling and emptying means 37 is preferably also equipped with a control unit 26 similar to pressure setting means 24 to actuate the conveying means 28 depending on the detailed parameters. The parameters may be the same as in the above-described embodiment with the pressure setting means 24.

A line 38 for removing and supplying the heat-conducting fluid 30 is preferably connected in the installed state at the bottom, especially at the lowest point, to the cavity 9 to be able to achieve an as extensive emptying as possible. For this, an opening 17 or 20 penetrating the outer shell 8 is again provided. Moreover, an opening 17 or 20 for aerating and venting the cavity 9 may optionally be provided in the installed state at the top, especially at the highest point. To avoid the penetration of contaminants, and especially splash water, here as well, a suitable valve means (not shown) may be provided. In the special embodiment shown in FIG. 11, the aerating and venting opening 17 or 20 lying at the top is connected to the storage tank 29 via an aerating and venting line 23. When filling the cavity 9 with the heat-conducting fluid 30 via the lower opening 17 or 20, this is conveyed from the tank 29, as a result of which a gas volume 39, which is located in the tank 29 above the heat-conducting fluid 30, increases. At the same time, when filling the cavity with heat-conducting fluid 30, gas escapes via the upper opening 17 or 20 and enters the tank 29 via the venting and aerating line 23. When emptying the cavity 9 of the fluid 30, it is the reverse, such that gas flows back from the tank 29 into the cavity 9. The fluid 30 conveyed back and forth, in the respective target space to be filled with fluid 30, i.e., the cavity 9 during filling and the tank 29 during emptying, displaces exactly as much air or other gas, as must be refilled to the respective starting space from which the fluid is drawn, i.e., the tank 29 during filling and the cavity 9 during emptying. By means of the direct connection of the two spaces (9 and 29), the air or respective gas may thus also be conveyed back and forth. Thus, it is also possible to convey back and forth, instead of fluid 30, the respective gas by means of a corresponding conveying means 28' indicated by broken line in FIG. 11; the fluid 30 then follows automatically.

For the embodiments of FIGS. 10 and 11 with a pressure setting means 24 or with a filling and emptying means 27, it is preferable when the respective molding 11 has an open-pore, especially microporous, structure.

According to another variation of the invention, a combined embodiment is provided, which has both a pressure setting means 24 according to the explanations of FIG. 10 and a filling and emptying means 27 according to the explanations of FIG. 11.

In the embodiments of FIGS. 8 and 11, a longitudinal section of the tubular inner shell 6 is formed by a bellows (corrugated tubular body) 31. As shown here, the bellows 31 may be formed integrally with the respective inner shell 6. It is likewise possible to provide the bellows 31 as a separate component and to attach, for example, to weld or solder the bellows 31 to the corresponding, adjacent longitudinal sections of the inner shell 6. The bellows 31 can have a single-layer or else a multilayer wall. The bellows 31 is designed here such that it projects, starting from the inner shell 6, exclusively radially outwards, as it extends into the cavity 9, without contacting the outer shell 8. Thus, an annular space 32 or a radial distance 32 remains especially between bellows 31 and outer shell 8. By using such a bellows, the outer shell 8 can be rigidly connected to the inner shell 6 in the area of its longitudinal ends 33, 34, for example, by means of a welded connection or soldered connection. Heat-induced relative motions between the inner shell 6 and outer shell 8 can be compensated by the bellows 31. In order to reduce the flow resistance of the inner shell 6 in the area of the bellows 31, a guide tube may be provided according to FIGS. 8 and 11 on a side facing the inner area 7. This guide tube extends in the area of the bellows 31 and covers the bellows 31 towards the inner area 7. This guide tube 35 lays only slightly on the inside of the inner area 7 (slightly inwardly of the adjacent inner shell 6) and closes especially essentially flush with this inside. The guide tube 35 may be rigidly connected to the inner shell 6 and/or rigidly to the bellows 31, for example, in the area of one of its longitudinal ends 36 or 37, while it is otherwise loose in relation to the inner shell 6 and in relation to the bellows 31. Thus, heat-induced relative motions between the guide tube 35 and inner shell 6 or between the guide tube 35 and bellows 31 are also possible.

At least in the embodiments of FIGS. 8 and 11, the component 5 designed here as a piece of pipe is preferably designed such that the outer shell 8 forms a supporting structure, while the inner shell 6 forms a non-supporting structure. Accordingly, the outer shell 8 is formed with a greater wall thickness compared to the inner shell 6.

While specific embodiments of the invention have been shown and described in detail to illustrate the application of the principles of the invention, it will be understood that the invention may be embodied otherwise without departing from such principles.

What is claimed is:

1. An exhaust system component for an exhaust system of an internal combustion engine, the exhaust system component comprising:
    an inner shell which defines an exhaust-gas-guiding inner area;
    an outer shell arranged on an outer side of said inner shell turned away from said inner area, said inner shell and said outer shell cooperating to form a cavity between said inner shell and said outer shell;
    heat insulation arranged in said cavity, wherein said insulation comprises a porous dimensionally stable molding; and
    a pressure setting means for setting the pressure prevailing in the cavity depending upon parameters.

2. An exhaust system component in accordance with claim 1, wherein at least one of:
    the molding is a flexurally rigid body;
    the molding is adapted to the shape of the cavity; and
    the molding comprises a microporous body or consists of a microporous material.

3. An exhaust system component in accordance with claim 1, wherein said insulation comprises an additional porous dimensionally stable molding to provide a plurality of moldings each with a connection feature, which mesh with one another in a positive-locking manner.

4. An exhaust system component in accordance with claim 1, wherein said cavity is water-tight and gas-impermeable to the environment of the exhaust system component and wherein at least one of
    the outer shell has at least one opening covered by one of a water-tight and gas-permeable membrane and a vent fluidically connected to said cavity; and
    the outer shell contains at least one opening and a tube body is connected to said opening or the opening is covered by means of a scoop, which cooperates with the other shell to form an opening to the environment at a distance from the opening of the outer shell.

5. An exhaust system component in accordance with claim 1, wherein:
said inner shell and said outer shell have a tubular shape; and
said cavity and said insulation have an annular shape.

6. An exhaust system component in accordance with claim 5, wherein a longitudinal section of said inner shell is formed by a bellows, wherein said bellows is covered on one side facing the inner area, wherein a guide tube is axially fixed on a longitudinal end in relation to said inner shell or to said bellow and is otherwise loose in relation to said inner shell and to said bellows.

7. An exhaust system component in accordance with claim 1, wherein said pressure setting means comprises an evacuation pump fluidically connected to said cavity on a suction side and a control unit for activating said evacuation pump depending on the parameters.

8. An exhaust system component for an exhaust system of an internal combustion engine, the exhaust system component comprising:
an inner shell which defines an exhaust-gas-guiding inner area;
an outer shell arranged on an outer side of said inner shell turned away from said inner area, said inner shell and said outer shell cooperating to form a cavity between said inner shell and said outer shell;
heat insulation arranged in said cavity, wherein said insulation comprises a porous dimensionally stable molding; and
a filling and emptying means for filling the cavity with a heat-conducting fluid and for emptying heat-conducting fluid from the cavity.

9. An exhaust system component in accordance with claim 1, wherein said molding has an open-pore structure.

10. An exhaust system component in accordance with claim 8, wherein said filling and emptying means comprises a conveying means fluidically connected to said cavity, a tank and a control unit for activating the conveying means depending on the parameters.

11. An exhaust system comprising:
an exhaust-gas-guiding tube; and
an exhaust system component connected to said exhaust-gas-guiding tube, said exhaust system component comprising:
an inner shell which defines an exhaust-gas-guiding inner area;
an outer shell arranged on an outer side of said inner shell turned away from said inner area, said inner shell and said outer shell cooperating to form a cavity between said inner shell and said outer shell;
heat insulation arranged in said cavity, wherein said insulation comprises a porous dimensionally stable molding; and
a pressure setting means for setting the pressure prevailing in the cavity depending upon parameters.

12. An exhaust system in accordance with claim 11, wherein at least one of:
the molding is a flexurally rigid body;
the molding is adapted to the shape of the cavity; and
the molding comprises a microporous body or consists of a microporous material.

13. An exhaust system component in accordance with claim 11, wherein said insulation comprises an additional porous dimensionally stable molding to provide a plurality of moldings each with a connection feature, which mesh with one another in a positive-locking manner.

14. An exhaust system component in accordance with claim 11, wherein said cavity is water-tight and gas-impermeable to the environment of the exhaust system component and wherein at least one of
the outer shell has at least one opening covered by one of a water-tight and gas-permeable membrane and a vent fluidically connected to said cavity; and
the outer shell contains at least one opening and a tube body is connected to said opening or the opening is covered by means of a scoop, which cooperates with the other shell to form an opening to the environment at a distance from the opening of the outer shell.

15. An exhaust system component in accordance with claim 11, wherein:
said inner shell and said outer shell have a tubular shape; and
said cavity and said insulation have an annular shape.

16. An exhaust system component in accordance with claim 15, wherein a longitudinal section of said inner shell is formed by a bellows and said bellows is covered on one side facing the inner area, wherein a guide tube is axially fixed on a longitudinal end in relation to said inner shell or to said bellow and is otherwise free in relation to said inner shell and to said bellows.

17. An exhaust system component in accordance with claim 11, said pressure setting means comprises an evacuation pump fluidically connected to said cavity on a suction side and a control unit for activating said evacuation pump depending on the parameters.

18. An exhaust system comprising:
an exhaust-gas-guiding tube; and
an exhaust system component connected to said exhaust-gas-guiding tube, said exhaust system component comprising:
an inner shell which defines an exhaust-gas-guiding inner area;
an outer shell arranged on an outer side of said inner shell turned away from said inner area, said inner shell and said outer shell cooperating to form a cavity between said inner shell and said outer shell;
heat insulation arranged in said cavity, wherein said insulation comprises a porous dimensionally stable molding; and
a filling and emptying means for filling the cavity with a heat-conducting fluid and for emptying heat-conducting fluid from the cavity.

19. An exhaust system comprising:
an exhaust-gas-guiding tube; and
an exhaust system component connected to said exhaust-gas-guiding tube, said exhaust system component comprising:
an inner shell forming an exhaust-gas-guiding inner area;
an outer shell arranged on an outer side of said inner shell facing away from said inner area, said inner shell and said outer shell cooperating to form a cavity between said inner shell and said outer shell;
heat insulation arranged in said cavity, wherein said insulation comprises a porous dimensionally stable molded body; and
one or more of a pressure setting means for setting the pressure prevailing in the cavity depending upon parameters and a filling and emptying means for filling the cavity with a heat-conducting fluid and for emptying heat-conducting fluid from the cavity.

20. An exhaust system in accordance with claim 18, wherein said filling and emptying means comprises a conveying means fluidically connected to said cavity, a tank for holding the a heat-conducting fluid and a control unit for activating the conveying means depending on the parameters.

* * * * *